United States Patent
Wang et al.

(10) Patent No.: US 10,863,552 B2
(45) Date of Patent: *Dec. 8, 2020

(54) USER EQUIPMENT, ENODE B AND WIRELESS COMMUNICATION METHOD

(71) Applicant: Panasonic Intellectual Property Corporation of America, Torrance, CA (US)

(72) Inventors: Li Wang, Beijing (CN); Hidetoshi Suzuki, Kanagawa (JP); Joachim Loehr, Hessen (DE); Michael Einhaus, Hessen (DE); Lilei Wang, Beijing (CN); Masayuki Hoshino, Chiba (JP)

(73) Assignee: Panasonic Intellectual Property Corporation of America, Torrance, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/692,208

(22) Filed: Nov. 22, 2019

(65) Prior Publication Data

US 2020/0092921 A1    Mar. 19, 2020

Related U.S. Application Data

(63) Continuation of application No. 15/927,614, filed on Mar. 21, 2018, now Pat. No. 10,524,293, which is a
(Continued)

(51) Int. Cl.
*H04W 74/08* (2009.01)
*H04W 72/14* (2009.01)
(Continued)

(52) U.S. Cl.
CPC ....... *H04W 74/0833* (2013.01); *H04W 72/14* (2013.01); *H04W 74/004* (2013.01);
(Continued)

(58) Field of Classification Search
CPC ......... H04W 74/0833; H04W 74/0808; H04W 72/14; H04W 74/004; H04W 28/26; H04W 72/0453; H04W 72/044
See application file for complete search history.

(56) References Cited

U.S. PATENT DOCUMENTS 10,742,562 B2 * 8/2020 Si ........................ H04W 72/14
2014/0112289 A1   4/2014 Kim et al.
(Continued)

FOREIGN PATENT DOCUMENTS

| CN | 102548015 A | 7/2012 |
|---|---|---|
| JP | 2015-179994 A | 10/2015 |
| WO | 2015/066326 A1 | 5/2015 |

OTHER PUBLICATIONS

The Extended European Search Report dated Dec. 12, 2019 for the related European Patent Application No. 19193983.4.
(Continued)

*Primary Examiner* — Vinncelas Louis
(74) *Attorney, Agent, or Firm* — Seed IP Law Group LLP

(57) ABSTRACT

Provided are a user equipment (UE), an eNode B (eNB) and a wireless communication method for Licensed-Assisted Access (LAA). A UE for LAA according to one embodiment can comprise: a first circuit operative to perform a first listen-before-talk (LBT) in a system bandwidth; a second circuit operative to perform a second LBT in an allocated bandwidth; and a transmitter operative to transmit a signal in the allocated bandwidth if the first LBT is unsuccessful and the second LBT is successful.

6 Claims, 4 Drawing Sheets

Related U.S. Application Data continuation of application No. PCT/CN2015/092393, filed on Oct. 21, 2015.

(51) Int. Cl.
    *H04W 74/00*     (2009.01)
    *H04W 72/04*     (2009.01)
    *H04W 28/26*     (2009.01)

(52) U.S. Cl.
    CPC ........ *H04W 74/0808* (2013.01); *H04W 28/26* (2013.01); *H04W 72/044* (2013.01); *H04W 72/0453* (2013.01)

(56) References Cited

U.S. PATENT DOCUMENTS

| | | | |
|---|---|---|---|
| 2015/0049712 A1 | 2/2015 | Chen et al. | |
| 2017/0099126 A1* | 4/2017 | Yoo | H04J 11/0069 |
| 2017/0118728 A1 | 4/2017 | Harada et al. | |
| 2018/0235005 A1* | 8/2018 | Ansari | H04L 27/0006 |
| 2018/0352537 A1* | 12/2018 | Zhang | H04W 72/04 |

OTHER PUBLICATIONS

Intel Corporation: "Uplink transmission for LAA", 3GPP Draft; R2-152214_LAA_UP_LBT_V1, 3rd Generation Partnership Project (3GPP), Mobile Competence Centre ; 650, Route Des Lucioles ; F-06921 Sophia-Antipolis Cedex ; France, vol. RAN WG2, No. Fukuoka, Japan; May 25, 2015-May 29, 2015 May 16, 2015 (May 16, 2015), XP050973840, Retrieved from the Internet: URL:http://www.3gpp.org/ftp/tsg_ran/WG2_RL2/TSGR2_90/Docs/ [retrieved on May 16, 2015].

Alcatel-Lucent Shanghai Bell et al: "UL LBT and DL/UL Frame Structure for LAA", 3GPP Draft; R1-154574_UL_LBT-Final, 3rd Generation Partnership Project (3GPP), Mobile Competence Centre ; 650, Route Des Lucioles ; F-06921 Sophia-Antipolis Cedex ; France, vol. RAN WG1, No. Beijing, China; Aug. 25, 2015-Aug. 28, 2015 Aug. 23, 2015 (Aug. 23, 2015), XP051039505, Retrieved from the Internet: URL:http://www.3gpp.org/ftp/Meetings_3GPP_SYNC/RAN1/Docs/ [retrieved on Aug. 23, 2015].

International Search Report of PCT application No. PCT/CN2015/092393 dated Jul. 6, 2016.

The partial supplementary European Search Report (R.164 EPC), dated Sep. 5, 2018, for the related European Patent Application No. 15906450.0.

\* cited by examiner

USER EQUIPMENT, ENODE B AND WIRELESS COMMUNICATION METHOD

BACKGROUND

1. Technical Field

The present disclosure relates to the field of wireless communication, and in particular, to a user equipment (UE), an eNode B (eNB) and a wireless communication method for Licensed-Assisted Access (LAA).

2. Description of the Related Art

Rapid growth of mobile data forces operators to utilize the finite frequency spectrum with higher and higher efficiency, while plenty of unlicensed frequency spectra are utilized less efficiently only by Wi-Fi, Bluetooth, etc. LTE-U (LTE-unlicensed) and LAA (Licensed Assisted Access) can extend the LTE spectrum to unlicensed band that would augment the LTE network capacity directly and dramatically.

SUMMARY

One non-limiting and exemplary embodiment provides an approach to facilitate UL multiplexing, especially UL FDMA between PRACH (Physical Random Access Channel) and PUSCH (Physical Uplink Shared Channel)/PUCCH (Physical Uplink Control Channel).

In one general aspect, the techniques disclosed here feature a user equipment (UE) for licensed-assisted access (LAA) comprising: a first circuit operative to perform a first listen-before-talk (LBT) in a system bandwidth; a second circuit operative to perform a second LBT in an allocated bandwidth; and a transmitter operative to transmit a signal in the allocated bandwidth if the first LBT is unsuccessful and the second LBT is successful.

It should be noted that general or specific embodiments may be implemented as a system, a method, an integrated circuit, a computer program, a storage medium, or any selective combination thereof.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF THE DRAWINGS

The foregoing and other features of the present disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings, in which:

DETAILED DESCRIPTION

Figure 1:
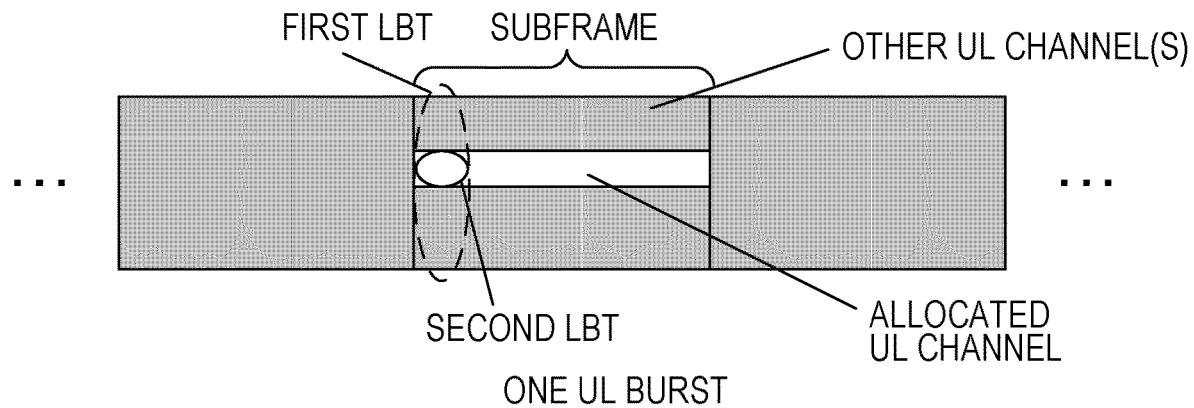
FIG. 1 is a schematic diagram for illustrating LBTs at both the system bandwidth and the allocated bandwidth.

In the following detailed description, reference is made to the accompanying drawings, which form a part thereof. In the drawings, similar symbols typically identify similar components, unless context dictates otherwise. It will be readily understood that the aspects of the present disclosure can be arranged, substituted, combined, and designed in a wide variety of different configurations, all of which are explicitly contemplated and make part of this disclosure.

In LAA, random access procedure at unlicensed carrier would be required for UL timing adjustment in case of contention-free random access or stand-alone operation in unlicensed spectrum in case of contention-based random access. LBT may be required in most cases. However, current LBT which is performed over the system bandwidth is difficult to support UL multiplexing since independent LBT at each UE would mutually block each other.

In order to support UL multiplexing, especially UL FDMA between PRACH and PUSCH/PUCCH, a new LBT mechanism is introduced in the present disclosure. In the new mechanism, LBTs will be performed at both the system bandwidth and an allocated bandwidth (for example, PRACH). With such LBT mechanism, UEs assigned with different PRBs in one subframe would not block each other during LBT.

In an embodiment of the present disclosure, there is provided a wireless communication method for LAA performed by a UE. FIG. 1 is a schematic diagram for illustrating LBTs at both the system bandwidth and the allocated bandwidth. In FIG. 1, the allocated bandwidth is represented by an allocated UL channel (e.g. PRACH), and the other bandwidth in the system bandwidth is represented by other UL channel(s) (e.g. PUSCH/PUCCH). A UE which wants to send a preamble in PRACH would sense the channel at both the system bandwidth and the PRACH bandwidth. By utilizing FDM (Frequency Division Multiplexing) property between PRACH and PUSCH/PUCCH in the same subframe, LBT at the PRACH is not impacted by transmission of PUSCH/PUCCH which is located in the orthogonal band to the PRACH. On the other hand, LBT at the system bandwidth can prevent interference to transmission from other node(s) (i.e. the node(s) other than the scheduling eNB and this eNB scheduled UEs). If the system bandwidth is sensed to be busy but the PRACH bandwidth is idle, the UE would be able to access the PRACH channel. If both the system bandwidth and the PRACH bandwidth are sensed to be busy, the UE would not be able to access the PRACH. If both the system bandwidth and the PRACH bandwidth are sensed to be idle, there can be two alternatives. One is that the UE would not send a preamble, and the other is that the UE would send a wideband preamble (e.g. near 20 MHz) in the system bandwidth.

Figure 2:
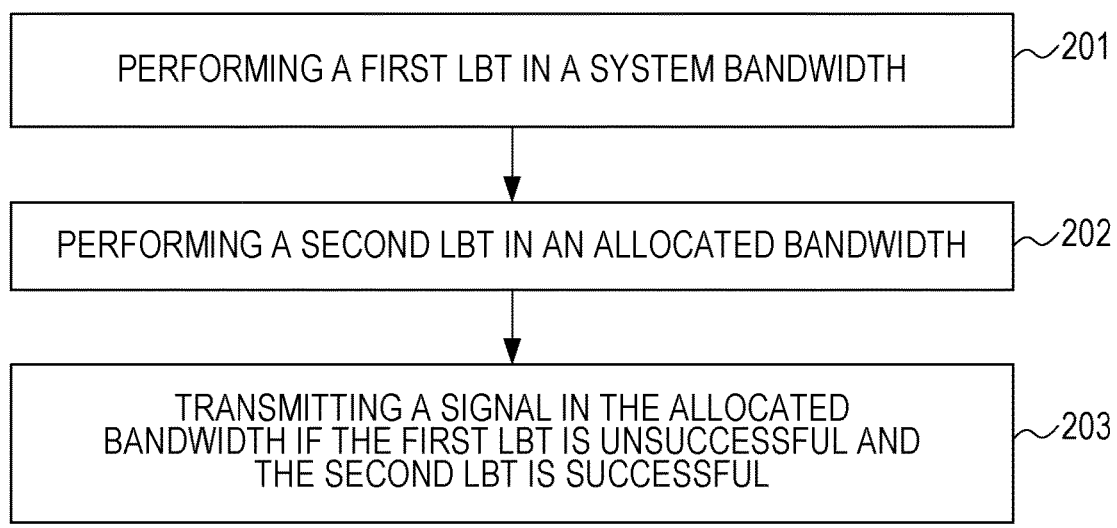
FIG. 2 illustrates a flowchart of a wireless communication method performed by a UE according to an embodiment of the present disclosure.

FIG. 2 illustrates a flowchart of the wireless communication method 200 according to an embodiment of the present disclosure. The wireless communication method 200 comprises a step 201 of performing a first LBT in a system bandwidth; a step 202 of performing a second LBT in an allocated bandwidth (e.g. PRACH); a step 203 of transmitting a signal in the allocated bandwidth if the first LBT is unsuccessful (the system bandwidth is busy) and the second LBT is successful (the allocated bandwidth is idle). As described in the above, the allocated bandwidth can be PRACH, and the signal can be a preamble (referred to as a first preamble hereinafter). However, in the present disclosure, the allocated bandwidth can be any other band other than PRACH. Optionally, the UE sends a second preamble (a wideband preamble) over the system bandwidth if both the first LBT and the second LBT are successful; or the UE does not transmit a preamble if both the first LBT and the second LBT are successful. It is noted that the sequence of the first LBT and the second LBT is not limited herein, for example, they can be performed simultaneously.

Figure 3:
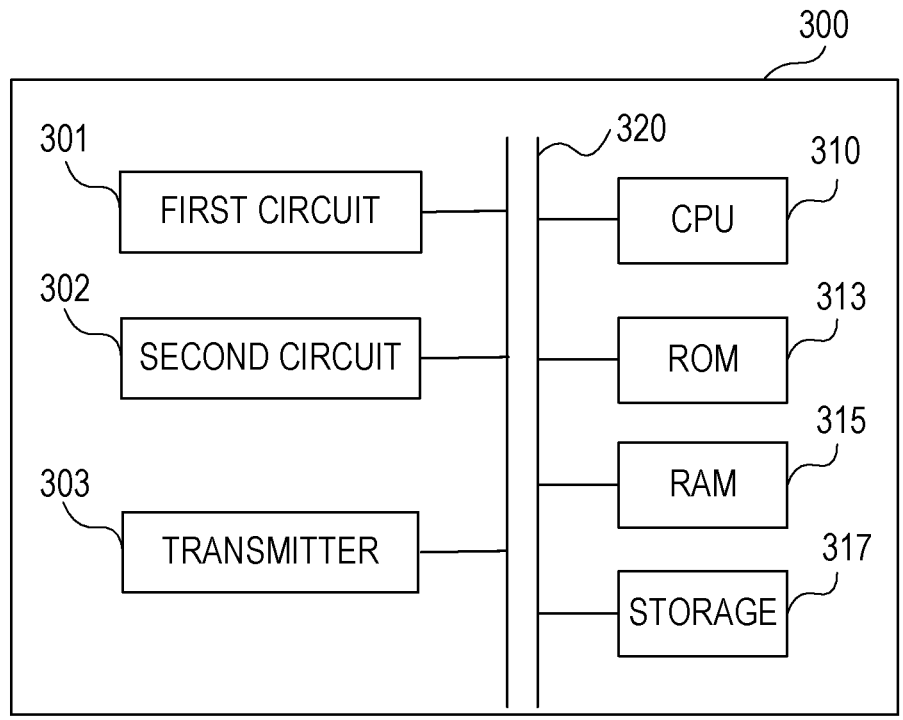
FIG. 3 schematically illustrates a block diagram of a UE according to an embodiment of the present disclosure.

An embodiment of the present disclosure also provides a UE for LAA to perform the above communication method. FIG. 3 schematically illustrates a block diagram of the UE 300 according to an embodiment of the present disclosure. UE 300 can comprise a first circuit 301 operative to perform a first listen-before-talk (LBT) in a system bandwidth; a second circuit 302 operative to perform a second LBT in an allocated bandwidth; and a transmitter 303 operative to transmit a signal in the allocated bandwidth if the first LBT is unsuccessful and the second LBT is successful. The allocated bandwidth can be PRACH, and the signal can be a first preamble. Optionally, the transmitter can be further operative to transmit a second preamble (a wideband preamble) over the system bandwidth if both the first LBT and the second LBT are successful; or the transmitter can be further operative to not transmit any preamble if both the first LBT and the second LBT are successful.

The UE 300 according to the present disclosure may optionally include a CPU (Central Processing Unit) 310 for executing related programs to process various data and control operations of respective units in the UE 300, a ROM (Read Only Memory) 313 for storing various programs required for performing various process and control by the CPU 310, a RAM (Random Access Memory) 315 for storing intermediate data temporarily produced in the procedure of process and control by the CPU 310, and/or a storage unit 317 for storing various programs, data and so on. The above first circuit 301, second circuit 302, transmitter 303, CPU 310, ROM 313, RAM 315 and/or storage unit 317 etc. may be interconnected via data and/or command bus 320 and transfer signals between one another.

Respective components as described above do not limit the scope of the present disclosure. According to one implementation of the disclosure, the functions of the above first circuit 301, second circuit 302 and transmitter 303 may be implemented by hardware, and the above CPU 310, ROM 313, RAM 315 and/or storage unit 317 may not be necessary. Alternatively, the functions of the above first circuit 301, second circuit 302 and transmitter 303 may also be implemented by functional software in combination with the above CPU 310, ROM 313, RAM 315 and/or storage unit 317 etc.

In an embodiment of the present disclosure, the PRACH resource can be assigned per UL burst by an eNB. In other words, the eNB assigns the PRACH resource for each UL burst. The PRACH resource can be indicated by the eNB or other UE(s). Accordingly, the above UE 300 can also comprise a receiver operative to receive an indication (i.e., which subframe(s) and which PRB(s) in the burst should be used for PRACH) of a PRACH resource for a UL burst sent by an eNode B (eNB) or another UE. Two examples for indicating the PRACH resource in a UL burst are described in the following.

Figure 4:
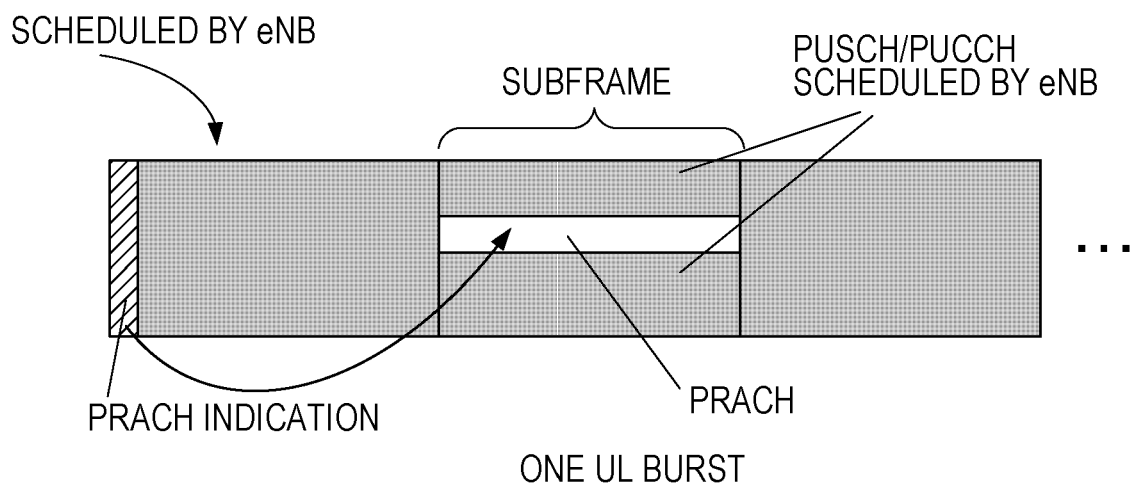
FIG. 4 schematically illustrates scheduling and indication of PRACH resource according to an embodiment of the present disclosure.

In a first example, the PRACH resource in a UL burst (one or more subframes) can be indicated by UE/UEs which has/have UL grant (i.e. UL data transmission). It is noted that multiple UEs can indicate same or different PRACH resource(s). PUSCH/PUCCH can be scheduled by an eNB via (E)PDCCH as current LTE design up to release 12. The eNB assigns the PRACH resource in the UL burst and also assigns which UE(s) will indicate the PRACH resource. For contention-free random access, the preamble order for a UE to perform random access will also be assigned by the eNB. For contention-based random access, the preamble order for a UE to perform random access will be randomly selected by the UE. After LBT succeeds at a UE with UL grant, the UE will send its UL data and also an indication of the PRACH resource in the scheduled resource. The indication of the PRACH resource is broadcast information which can be decoded by other UEs in the same cell. As shown in FIG. 4 which schematically illustrates scheduling and indication of the PRACH resource according to an embodiment of the present disclosure, the resources including the PRACH resource are scheduled by the eNB, and the PRACH indication can be sent in a UL burst structure indication by a UE with UL grant at the beginning of the UL burst. Alternatively, the PRACH indication can be sent by the UE with UL grant in the scheduled PUCCH or PUSCH. The UEs that hopes to send a preamble in the PRACH will monitor the indication of the PRACH resource by blind decoding. In order to reduce the blind detection complexity, the resource location and/or the format of the PRACH indication can be known by UE via predefinition or pre-configuration, or can be limited in a predefined or pre-configured limited set.

Figure 5:
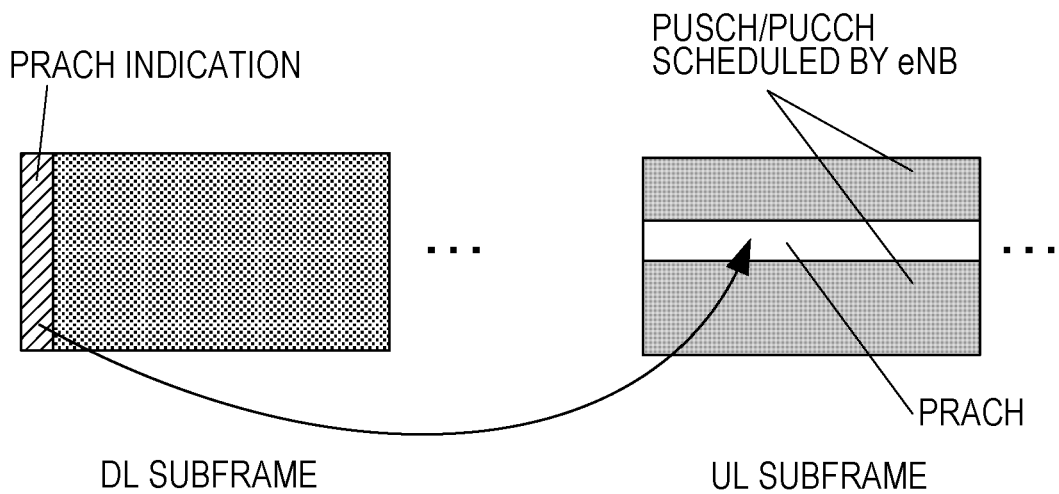
FIG. 5 schematically illustrates indication of PRACH resource by an eNB according to an embodiment of the present disclosure.

In a second example, the PRACH resource can be directly indicated by an eNB for example in the unlicensed band. The PRACH resource can be indicated by the eNB in a burst structure indication which is sent at the beginning of burst structure consisting of both DL and UL. FIG. 5 schematically illustrates the indication of PRACH resource by an eNB according to an embodiment of the present disclosure. In FIG. 5, a burst structure consisting of both DL and UL is indicated. In the burst structure, the burst structure indication including the PRACH indication can be carried in PDCCH (depicted in FIG. 5), EPDCCH, or a new channel. In addition, PUSCH/PUCCH can be scheduled by the eNB via (E)PDCCH. The UE that hopes to send a preamble in the PRACH can monitor the indication of PRACH resource by blind decoding.

Figure 6:
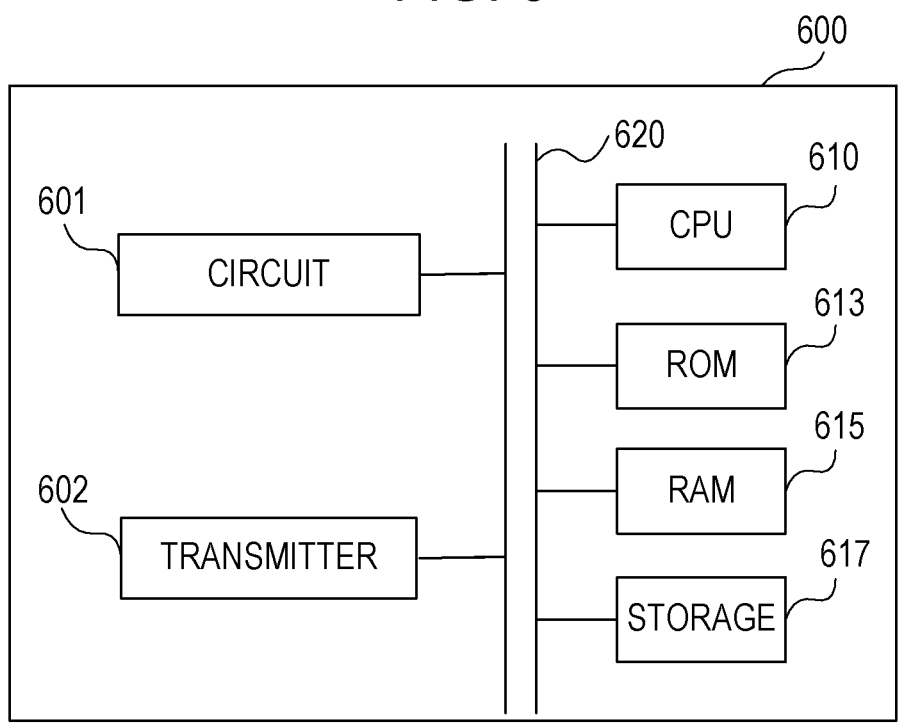
FIG. 6 schematically illustrates a block diagram of an eNB according to an embodiment of the present disclosure.

In order to support indication of the PRACH resource, embodiments of the present disclosure also provide an eNB and a wireless communication method performed by the eNB. FIG. 6 schematically illustrates a block diagram of an eNB 600 according to an embodiment of the present disclosure. The eNB 600 can comprise a circuit 601 operative to assign a PRACH resource per UL burst; and a transmitter 602 operative to transmit an indication of the PRACH resource to UE(s). It is noted that the eNB 600 is applicable to both the above first and second examples. In the above first example, the transmitter 602 can transmit the indication of the PRACH resource to a specific UE for the specific UE to broadcast the indication to other UEs. In this case, the transmitter can be further operative to transmit a UL grant to a UE for the UE to broadcast the indication for the PRACH resource. In the above second example, the transmitter 602 can broadcast the indication of the PRACH resource in the unlicensed band to UEs directly.

The eNB 600 according to the present disclosure may optionally include a CPU (Central Processing Unit) 610 for executing related programs to process various data and control operations of respective units in the eNB 600, a ROM (Read Only Memory) 613 for storing various programs required for performing various process and control by the CPU 610, a RAM (Random Access Memory) 615 for storing intermediate data temporarily produced in the procedure of process and control by the CPU 610, and/or a storage unit 617 for storing various programs, data and so on. The above circuit 601, and transmitter 602, CPU 610, ROM 613, RAM 615 and/or storage unit 617 etc. may be interconnected via data and/or command bus 620 and transfer signals between one another.

Respective components as described above do not limit the scope of the present disclosure. According to one implementation of the disclosure, the functions of the above circuit 601 and transmitter 602 may be implemented by hardware, and the above CPU 610, ROM 613, RAM 615 and/or storage unit 617 may not be necessary. Alternatively, the functions of the above circuit 601 and transmitter 602 may also be implemented by functional software in combination with the above CPU 610, ROM 613, RAM 615 and/or storage unit 617 etc.

Figure 7:
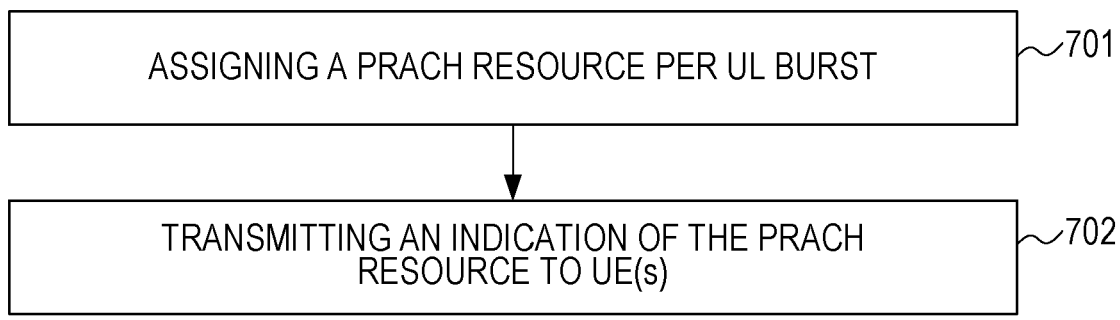
FIG. 7 illustrates a flowchart of a wireless communication method performed by an eNB according to an embodiment of the present disclosure.

FIG. 7 illustrates a flowchart of a wireless communication method 700 performed by an eNB according to an embodiment of the present disclosure. The method 700 can comprise: a step 701 of assigning a PRACH resource per UL burst; and a step 702 of transmitting an indication of the PRACH resource to UE(s). Optionally, the method 700 can also comprise transmitting a UL grant to a UE for the UE to broadcast the indication for the PRACH resource.

Figure 8:
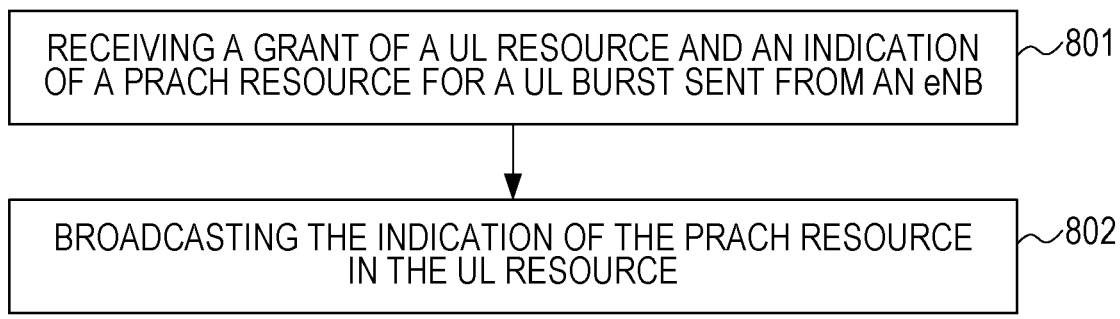
FIG. 8 illustrates a flowchart of a wireless communication method performed by a UE according to an embodiment of the present disclosure.

In addition, for the example of indicating the PRACH resource by a UE, embodiments of the present disclosure provide a UE for indicating the PRACH resource and a communication method performed by the UE. The UE can comprise a receiver operative to receive a grant of a UL resource and an indication of a PRACH resource for a UL burst sent from an eNB; and a transmitter operative to broadcast the indication of the PRACH resource in the UL resource. It is noted that the structure and the implementation described for UE 300 can also be applied to the UE here. FIG. 8 illustrates a flowchart of a wireless communication method 800 performed by the UE for indicating the PRACH resource according to an embodiment of the present disclosure. The method 800 can comprise a step 801 of receiving a grant of a UL resource and an indication of a PRACH resource for a UL burst sent from an eNB; and a step 802 of broadcasting the indication of the PRACH resource in the UL resource.

According to the above manners of indicating PRACH resource in embodiments of the present disclosure, PRACH multiplexing with PUSCH/PUCCH can be supported by dynamic PRACH resource indication per burst.

Figure 9:
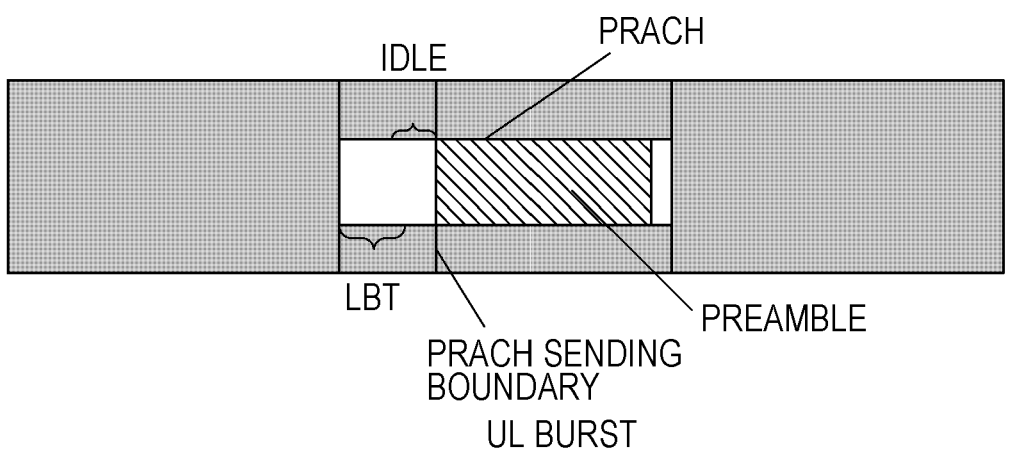
FIG. 9 schematically illustrates an example of sending PRACH after an idle period from the ending of LBT.

In addition, further enhancement on multiplexing within PRACH is introduced according to an embodiment of the present disclosure. Usually, CDM (Code Division Multiplexing) at PRACH is less likely because of mutual blocking between UEs with different sending time. In order to support CDM in PRACH under the LBT requirement, to add an idle period (e.g. maximum single trip delay assumed in unlicensed spectrum) after LBT and before the boundary for sending PRACH is beneficial. According to an embodiment of the present disclosure, the transmitter of the UE 300 can be operative to transmit the preamble (first preamble) in the PRACH after a time period (idle period) from the time when the first LBT and the second LBT are finished, instead of transmitting the preamble right after the LBTs are finished. FIG. 9 schematically illustrates an example of sending the PRACH after an idle period from the ending of the LBTs. It can be seen from FIG. 9 that the PRACH sending boundary (the beginning of sending a preamble in the PRACH) is not right after the ending of the LBT but there is an idle period between them. In this way, it is possible to alleviate the mutual blocking between UEs. The idle period can be determined for example based on the maximum single trip delay assumed in the unlicensed spectrum. For the 5 GHz deployment, the cell coverage can be much smaller than the traditional 2-3 GHz deployment. Taking PRACH format 0 as an example, 96 μs guard period (round-trip-delay) corresponds to a maximum cell radius of 14.5 km, which is more than required for the 5 GHz deployment. If the maximum cell radius at 5 GHz is less than 1 km, only 10 μs is needed for guard period. Therefore, the boundary for sending PRACH can be 80 μs after the subframe boundary.

The present disclosure can be realized by software, hardware, or software in cooperation with hardware. Each functional block used in the description of each embodiment described above can be realized by an LSI as an integrated circuit, and each process described in the each embodiment may be controlled by LSI. They may be individually formed as chips, or one chip may be formed so as to include a part or all of the functional blocks. They may include a data input and output coupled thereto. The LSI here may be referred to as an IC, a system LSI, a super LSI, or an ultra LSI depending on a difference in the degree of integration. However, the technique of implementing an integrated circuit is not limited to the LSI and may be realized by using a dedicated circuit or a general-purpose processor. In addition, a FPGA (Field Programmable Gate Array) that can be programmed after the manufacture of the LSI or a reconfigurable processor in which the connections and the settings of circuits cells disposed inside the LSI can be reconfigured may be used.

It is noted that the present disclosure intends to be variously changed or modified by those skilled in the art based on the description presented in the specification and known technologies without departing from the content and the scope of the present disclosure, and such changes and applications fall within the scope that claimed to be protected. Furthermore, in a range not departing from the content of the disclosure, the constituent elements of the above-described embodiments may be arbitrarily combined.

Embodiments of the present disclosure can at least provide the following subject matters.

1. A user equipment (UE) for licensed-assisted access (LAA) comprising:
   a first circuit operative to perform a first listen-before-talk (LBT) in a system bandwidth;
   a second circuit operative to perform a second LBT in an allocated bandwidth; and
   a transmitter operative to transmit a signal in the allocated bandwidth if the first LBT is unsuccessful and the second LBT is successful.

2. The user equipment according to 1, wherein
   the allocated bandwidth is a physical random access channel (PRACH), and the signal is a first preamble.

3. The user equipment according to 2, wherein
the transmitter is further operative to transmit a second preamble over the system bandwidth if both the first LBT and the second LBT are successful.

4. The user equipment according to 2, wherein
the transmitter is further operative to not transmit any preamble if both the first LBT and the second LBT are successful.

5. The user equipment according to any of 2-4, further comprising:
a receiver operative to receive an indication of a PRACH resource for an uplink (UL) burst sent by an eNode B (eNB) or another user equipment (UE).

6. The user equipment according to 2, wherein
the transmitter is further operative to transmit the first preamble in the PRACH after a time period from the time when the first LBT and the second LBT are finished.

7. An eNode B for licensed-assisted access (LAA) comprising:
a circuit operative to assign a PRACH resource per UL burst; and
a transmitter operative to transmit an indication of the PRACH resource to UE(s).

8. The eNode B according to 7, further comprising:
the transmitter is further operative to transmit a UL grant to a UE for the UE to broadcast the indication for the PRACH resource.

9. A user equipment for licensed-assisted access (LAA) comprising:
a receiver operative to receive a grant of a UL resource and an indication of a PRACH resource for a UL burst sent from an eNB; and
a transmitter operative to broadcast the indication of the PRACH resource in the UL resource.

10. A wireless communication method for licensed-assisted access (LAA) performed by a UE, comprising:
performing a first listen-before-talk (LBT) in a system bandwidth;
performing a second LBT in an allocated bandwidth; and
transmitting a signal in the allocated bandwidth if the first LBT is unsuccessful and the second LBT is successful.

11. The wireless communication method according to 10, wherein
the allocated bandwidth is a physical random access channel (PRACH), and the signal is a first preamble.

12. The wireless communication method according to 11, further comprising:
transmitting a second preamble over the system bandwidth if both the first LBT and the second LBT are successful.

13. The wireless communication method according to 11, wherein
no preamble is transmitted if both the first LBT and the second LBT are successful.

14. The wireless communication method according to any of 11-13, further comprising:
receiving an indication of a PRACH resource for an uplink (UL) burst sent by an eNode B (eNB) or another UE.

15. The wireless communication method according to 11, wherein
the first preamble is transmitted in the PRACH after a time period from the time when the first LBT and the second LBT are finished.

16. A wireless communication method for licensed-assisted access (LAA) performed by an eNB, comprising:
assigning a PRACH resource per UL burst; and
transmitting an indication of the PRACH resource to UE(s).

17. The wireless communication method according to 16, further comprising:
transmitting a UL grant to a UE for the UE to broadcast the indication for the PRACH resource.

18. A wireless communication method for licensed-assisted access (LAA) performed by a UE, comprising:
receiving a grant of a UL resource and an indication of a PRACH resource for a UL burst sent from an eNB; and
broadcasting the indication of the PRACH resource in the UL resource.

In addition, embodiments of the present disclosure can also provide an integrated circuit which comprises module(s) for performing the step(s) in the above respective communication methods. Further, embodiments of the present can also provide a computer readable storage medium having stored thereon a computer program containing a program code which, when executed on a computing device, performs the step(s) of the above respective communication methods.

What is claimed is:
1. An eNodeB (eNB), comprising:
a transmitter, which, in operation, transmits to a user equipment (UE) via a Physical Downlink Control Channel (PDCCH) an indication of an allocated bandwidth with an unlicensed carrier; and
a receiver, which,
in response to the UE unsuccessfully performing a first listen-before-talk (LBT) in a system bandwidth with the unlicensed carrier and successfully performing a second LBT in the allocated bandwidth, receives an uplink channel from the UE over the allocated bandwidth; and
in response to the UE unsuccessfully performing both the first LBT and the second LBT, does not receive the uplink channel from the UE.

2. The eNB according to claim 1, wherein the receiver, in response to the UE successfully performing the first LBT, receives the uplink channel from the UE over the system bandwidth.

3. The eNB according to claim 1, wherein:
the indication of the allocated bandwidth specifies a Physical Random Access Channel (PRACH) resource and is provided by the eNodeB or by another UE.

4. A method performed by an eNodeB (eNB), comprising:
transmitting to a user equipment (UE) via a Physical Downlink Control Channel (PDCCH) an indication of an allocated bandwidth with an unlicensed carrier,
in response to the UE unsuccessfully performing a first listen-before-talk (LBT) in a system bandwidth with the unlicensed carrier and successfully performing a second LBT in the allocated bandwidth, receiving an uplink channel from the UE over the allocated bandwidth, and
in response to the UE unsuccessfully performing both the first LBT and the second LBT, not receiving the uplink channel from the UE.

5. The method according to claim 4, comprising:
in response to the UE successfully performing the first LBT, receiving the uplink channel from the UE over the system bandwidth.

6. The method according to claim 4, wherein:
the indication of the allocated bandwidth specifies a Physical Random Access Channel (PRACH) resource and is provided by the eNodeB or by another UE.

* * * * *